Figure 1:
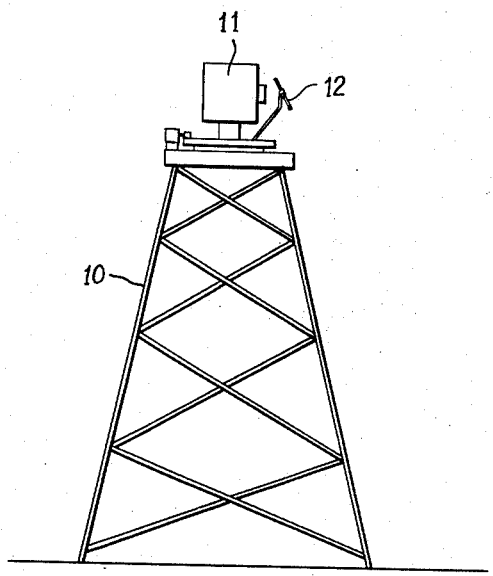

Oct. 14, 1958

B. CARLIN 2,856,602

RADIANT ENERGY REFLECTIVE MEDIUM

Filed Oct. 12, 1955

INVENTOR.
BENSON CARLIN
BY
ATTORNEYS

United States Patent Office 2,856,602
Patented Oct. 14, 1958

2,856,602

RADIANT ENERGY REFLECTIVE MEDIUM

Benson Carlin, Fair Lawn, N. J., assignor to Alcar Instruments, Inc., Little Ferry, N. J., a corporation of New Jersey Application October 12, 1955, Serial No. 539,967

5 Claims. (Cl. 343—753)

The present invention relates generally to the reflection of high-frequency radiant energy and more particularly to a conditioned atmospheric medium operative in the microwave region and having quasi-optical characteristics.

The quasi-optical nature of microwave propagation makes it possible to focus microwave energy into relatively sharp beams and to project such beams along desired paths. Thus, in a radar system, a beam of pulsed microwave energy is projected toward a target and reflections or echoes are intercepted for the purpose of determining the direction and range of the target. In a microwave relay system, a beam from one station is directed toward a companion station to effect line of sight transmission.

In accordance with the well-known law of physical optics, the sharpness of a beam passing through an aperture of given size depends on the ratio of the diameter of the aperture to the wave length of the radiation in the beam. Likewise the sharpness of the beam produced by a radar or microwave relay antenna (which may be treated optically as an aperture) depends on the ratio of the antenna dimensions to the wave lengths used. For an antenna of given size, the breadth of the beam produced is proportional to the wave length. The conventional radar antenna is constituted by a source of radiation or antenna feed disposed at the focus of a reflector structure. Clearly to obtain a sharp beam, a large and massive reflector structure is entailed.

Particularly in the case of airborne radar where a large antenna structure cannot be tolerated for aerodynamic reasons, it is important to produce sharp radar beams with an antenna structure of modest size. This dictates the use of ultra-high frequencies, that is, radiant energy in the microwave region (less than 30 cm.). A lower limit on the wave lengths which can be used for radar systems is fixed by the onset of atmospheric absorption of microwave energy. Below a wave length of about 2 cm., serious absorption occurs because of a molecular transition in water vapor which can be excited by the radiation.

Since, as a practical matter, radar systems of good range cannot be effectively operated below a wave length of 2 cm., in order to obtain sharp beams it becomes necessary to enlarge the size of the reflector structure. As it is also necessary to effect a scanning motion of the antenna, the use of a large reflector creates difficult mechanical problems, to say nothing of the expense incurred by such elaborate installations.

In view of the foregoing, it is the principal object of the present invention to provide a reflecting medium for high-frequency radiant energy which dispenses with mechanical structures.

More particularly, it is an object of the invention to provide a reflecting medium for high-frequency radiant energy which is constituted by a conditioned atmospheric pattern having reflective or refractive characteristics.

Still another object of the invention is to produce a reflecting or refractive medium by means of ultrasonic energy.

Briefly stated, the present invention is based on the recognition that refractive properties may be imparted to the atmosphere with respect to high-frequency radiant energy and that these properties may be exploited to effect reflection of such energy. In accordance with the invention, an ultrasonic generator is adapted to condition a predetermined atmospheric area to produce a pattern of alternate layers of rarefaction and compression having refractive and reflective properties relative to incident high-frequency radiant energy.

For a better understanding of the invention as well as further objects and other features thereof, reference is had to the following detailed description to be read in conjunction with the accompanying drawing, wherein Fig. 1 is a schematic diagram of a radar antenna in accordance with the invention.

Figure 2:
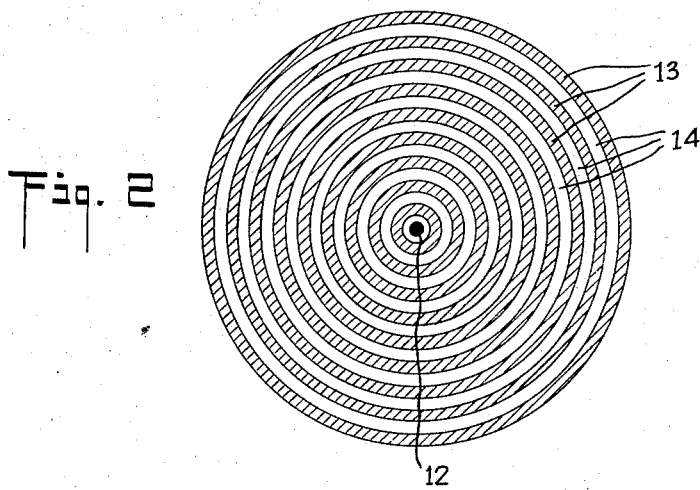

Fig. 2 is a schematic representation of a conditioned atmospheric pattern produced by the antenna in Fig. 1.

The earth's atmosphere, excluding the ionosphere, is for all practical purposes transparent to radio waves of lower than 1000 mc./sec. In the microwave region, however, the atmosphere is not wholly transparent. It is known that the normal vertical gradient of refractive index in the atmosphere acts to introduce a slight downward curvature in the path of light. This is also true of microwaves. Were this curvature only a few times greater, it would equal the curvature of the earth itself and it would then be possible for rays to bend around the earth without leaving the surface. That is to say, no horizon would exist for microwaves. It has been found that refractive index gradients of the requisite strength can be produced under some conditions by temperature gradients alone. For example, if land heated by the sun cools by radiation at night, a fairly thin layer of cold (hence dense) air may be formed just above the ground which results in an unusually rapid decrease of refractive index with height, the index of the lower layer being abnormally great. In accordance with the present invention, refractive properties are imparted to a predetermined area of the atmosphere by means of an ultrasonic disturbance creating alternate layers of rarefaction and compression. The refractive properties of the conditioned atmospheric pattern may be controlled to effect reflection of microwave energy or to function as a microwave lens producing a beam of a desired shape.

Another important influence on the propagation of radio waves is the ionosphere, the ionized region existing in the upper atmosphere resulting from the action of ultra-violet ionization from the sun. A radio wave entering the ionosphere has a tendency to be bent earthward, if the conditions are favorable. The refractive index of an ionized medium depends on the dielectric constant of the medium, its electric charge and mass as well as the frequency of the incident radio wave. When the change in refractive index in a distance corresponding to a wave length is not negligibly small, then reflection as well as refraction takes place. This situation arises at the lower radio frequencies where the distance represented by the wave is large, and it also can occur even at relatively high frequencies as a result of electron clouds having very sharply defined edges.

In an antenna in accordance with the invention, the ultrasonic radiation not only produces layers alternately of rarefaction and compression but also excites ionization in the atmosphere. Ultrasonic waves of high intensity cause rapid and agitated motion of gas particles, giving rise to ionization effects, thereby setting up in the air a pattern equivalent to the layers in the ionosphere.

Referring now to the drawings and more particularly

Fig. 1, an antenna mount in accordance with the invention is constituted by a pedestal 10 providing the necessary elevation. Mounted on top of the pedestal is an ultrasonic generator 11 which may be in the form of a magnetostrictive transducer or any other suitable electromechanical or piezoelectric transducer means capable of producing ultrasonic waves of great intensity. Cooperatively disposed with respect to the ultrasonic generator is a microwave radiation source 12 which may be in the form of a dipole, a radiation horn or other conventional antenna feed means. The radiation feed is coupled in the usual manner to a microwave oscillator such as a magnetron. As shown in the drawing the ultrasonic generator 11 and the radiation source 12 are mounted on a turntable whereby said generator and source may be simultaneously rotated to produce a scanning beam.

While an ultrasonic generator has been disclosed, it is to be understood that any suitable source of compressional waves may be used, ranging in frequency from subsonic through sonic and ultrasonic.

As shown in Fig. 2, the ultrasonic radiator produces a wave motion in the atmosphere symbolized by a series of concentric rings, the cross-hatched rings 13 representing layers of rarefied atmosphere and the alternate white rings 14 representing layers of compression. The effective expanse of the ultrasonic pattern depends on the intensity of the wave produced and obviously has no mechanical limitations. When microwave energy passes through an atmospheric medium, the extent of angular displacement or refraction is dependent upon the angle of incidence, the density of the medium and its refractive index. The degree of refraction may therefore be controlled by adjusting the intensity of the ultrasonic wave to create a reflective medium. The antenna feed is positioned at the axis or focal point of the reflective pattern. To provide a reflective medium having a desired contour, the ultrasonic radiator may include suitable sonic reflectors to establish a sonic wave pattern such as a paraboloid.

Although the invention has been specifically described in connection with the reflection of microwaves, it is to be understood that it is also operative with other forms of radiant energy as, for example, high-frequency ultrasonic waves.

While there has been shown what is considered to be a preferred embodiment of the invention, it will be manifest that many changes and modifications may be made therein without departing from the essential spirit of the invention. It is intended, therefore, to cover in the annexed claims all such changes and modifications falling within the true scope of the invention.

What is claimed is:

1. A radiant antenna structure comprising means to condition the atmosphere to produce a pattern constituted by alternate layers of rarefaction and compression, and means to direct radiant energy onto said pattern to be reflected thereby.

2. A radiant antenna structure comprising an ultrasonic generator adapted to produce an atmospheric pattern constituted by alternate layers of rarefaction and compression, and a radiation feed directing radiant energy onto said pattern to be reflected thereby.

3. An antenna structure, as set forth in claim 1, wherein said generator is constituted by a magnetostrictive oscillator.

4. An antenna structure, as set forth in claim 1, wherein said generator is constituted by a crystal oscillator.

5. A antenna structure comprising a pedestal, an ultrasonic generator mounted on top of said pedestal and adapted to condition the atmosphere to create therein alternate layers of rarefaction and compression, a radiant energy source on said pedestal directed at said pattern, and means simultaneously to rotate said source and said generator to produce a scanning beam.

References Cited in the file of this patent

UNITED STATES PATENTS 2,391,914   McElhannon _____ Jan. 1, 1946